United States Patent [19]

Auborn

[11] 4,223,080
[45] Sep. 16, 1980

[54] CELL AND FUEL CELL ELECTRODES HAVING POLY(PHOSPHAZENE) BINDER

[75] Inventor: James J. Auborn, Warren, N.J.

[73] Assignee: Bell Telephone Laboratories, Incorporated, Murray Hill, N.J.

[21] Appl. No.: 38,347

[22] Filed: May 11, 1979

[51] Int. Cl.$^2$ .............................................. H01M 6/14
[52] U.S. Cl. .................................. 429/194; 429/199; 429/217
[58] Field of Search ............... 429/194, 196, 197, 199, 429/212, 217

[56] References Cited

U.S. PATENT DOCUMENTS 4,118,334  10/1978  Goebel ............................ 429/217 X

OTHER PUBLICATIONS

Heteroatom Ring Systems and Polymers, H. R. Allcock, Academic Press, 1967, pp. 128–136.
Jour. Electrochemical Soc. 112, Feb. 1965, pp. 117–124.

*Primary Examiner*—Charles F. LeFevour
*Attorney, Agent, or Firm*—Richard D. Laumann

[57] ABSTRACT

Cells or fuel cells having two or more electrodes and an electrolyte are described in which at least one of the electrodes has, in addition to the active electrode material, a poly(phosphazene) polymer which is a binder.

12 Claims, No Drawings

CELL AND FUEL CELL ELECTRODES HAVING POLY(PHOSPHAZENE) BINDER

TECHNICAL FIELD

This invention is concerned generally with cells and fuel cells and particularly with binders for cell and fuel cell electrodes.

BACKGROUND OF THE INVENTION

Much effort in recent years has been devoted to developing new or improved energy sources and storage devices. While there have been many aspects to this effort, considerable interest has been directed toward developing cells and fuel cells having compositions previously unused as active electrode material. For example, the layered dichalcogenides of the transition metals have been extensively investigated in several laboratories in recent years as candidates for the active positive electrode material in secondary cells.

Interest has also been directed toward other aspects of cells and fuel cells. For example, the maintenance of electrode structural integrity is frequently a problem in both cells and fuel cells because particles of many active electrode materials do adhere to each other. Consequently, structural integrity, for many active electrode materials, is increased by the addition to the electrode of an electrochemically nonactive material which acts as a binder for the particles of active electrode material.

The material used as a binder should possess several properties. For example, it should form an intimate mixture with the active electrode material, be both electrically conductive, either initially or after interaction with the solvent/electrolyte in such a manner as to become electrically conductive, and chemically inert with respect to the materials present within the cell or fuel cell. The reasons for these properties being desirable are readily apparent. If the binder does not form an intimate mixture for the active electrode material or if large amounts of binder are required to achieve adequate structural integrity, unused binder material is present and increases the cell's volume or weight over that theoretically achievable. An electrically nonconductive binder causes increased electrical losses within the cell and limits the rate at which current may be drawn from the cell. If the binder is not chemically stable with respect to materials used within the cell or fuel cell, the electrode properties will degrade during cell operation and perhaps also while the cell is sitting on a shelf. Other properties, such as solubility in common solvents, are desirable binder properties because they facilitate electrode fabrication.

Although a number of materials have been considered for and used as binders for electrodes in cells and fuel cells, the most widely used material at the present time appears to be poly(tetrafluoroethylene) which is commonly referred to as either PTFE or TEFLON. The latter term is a registered trademark. While completely adequate for many purposes, PTFE has drawbacks that limit its usefulness in cells. For example, the electrode weight is increased because PTFE is typically used in high weight percents in the electrode to obtain the desired structural integrity. Furthermore, PTFE is electrically nonconductive and severely limits the capacity of the cell to either charge or discharge at high current rates. Additionally, alkali metals, commonly used as negative electrode material, reduce PTFE. PTFE also has properties that complicate electrode fabrication. For example, fabrication of many types of electrodes is facilitated by mixing the active electrode material and the binder in an appropriate solvent prior to sintering. The insolubility of PTFE in most common solvents such as alkanes, aromatic hydrocarbons, alcohols, aldehydes, ketones, ethers, chlorinated hydrocarbon liquids and even inorganic solvents such as halides, oxyhalides and thiohalides severely limits the flexibility of the electrode fabrication process. Also, heating of the electrode is required to bind PTFE particles to each other.

SUMMARY OF THE INVENTION

It has been found that cells having two electrodes, at least one of which comprises an active electrode and a binder, may be constructed using poly(phosphazenes) having the general atom formula $(R_2P=N)_n$, n greater than or equal to 3, and R selected from the group consisting of alkoxy, alkyl, amino, aryl, aryloxy, halogen and phenoxy, as the binders. It is to be understood that poly(phosphazene) as used here encompasses substituted groups, heteropolymers and copolymers. In a preferred embodiment, poly(phosphazene) polymers in which R is a fluorinated alkoxy with the composition $OH_2C_{m+2}F_{2m+3}$, m greater than or equal to zero are used. If m=0, R is an ethoxy and poly(bis) trifluoro ethoxy phosphazene (PTFEP), $[PN(OCH_2CF_3)_2]_n$, $n \geq 3$ is the polymer and is used in catalytic electrodes utilizing materials, such as carbon, as the active surface upon which electrochemical reactions take place. In another preferred embodiment, PTFEP is used in electrodes having layered oxides or chalcogenides, such as $V_6O_{13}$ or $TiS_2$, as the active electrode material. The electrode may consist solely of the active material or it may also have an electrically conductive additive such as carbon. In another preferred embodiment, R is a phenoxy with the composition $OC_6H_5$. The polymer, poly(bis) phenoxyphosphazene (PPP), $[PN(OC_6H_5)_2]_n$, is used with electrodes having layered oxides or chalcogenides as the active materials. Electrodes fabricated with poly(phosphazenes) have mechanical properties comparable to those of PTFE-bound electrodes but contain significantly less binder material.

DETAILED DESCRIPTION

According to my invention, a cell or fuel cell having two or more electrodes and an electrolyte has a poly(phosphazene) binder in one or more electrodes in addition to the active or catalytic electrode material. Electrode, as used here, includes electrochemically active surfaces upon which a soluble active material may be reduced. Adequate mechanical and electrical properties of the electrode are obtained when the binder constitutes at least 0.5 percent, by weight, of the entire electrode.

Poly(phosphazene), as used in this specification, means the group of structures having the atom formula $(R_2P=N)_n$. The degree of polymerization, represented by n, is 3 or more. The precise degree of polymerization, and therefore the molecular weight of a particular composition, has not been found to be a critical consideration for use of poly(phosphazenes) as binders provided that n is equal to or greater than 3. The side groups, represented by R, can be any group such as halogen, alkyl, aryl, amino, alkoxy, aryloxy or phenoxy. R need not be the same on both sides of the polymer backbone or on all monomers, i.e., poly(phosphazene)

as used here encompasses heteropolymers, copolymers and polymers with substituted side groups. Preferred side groups include those in which R is a fluorinated alkoxy having the composition $OH_2C_{m+2}F_{2m+3}$, m greater than or equal to zero and those in which R is a phenoxy having the composition $OC_6H_5$.

Preparation of the poly(phosphazenes) is well known and described in the literature, for example, in *Phosphorus Nitrogen Compounds*, by H. R. Allcock and published by Academic Press, 1972. The necessary modifications of the general preparatory techniques discussed there required to obtain a particular composition will be readily apparent to those working in the art and need not be elaborated upon.

Fabrication of the electrode containing the binder may be done by conventional techniques. An exemplary technique will be briefly outlined. The poly(phosphazene) polymer is dissolved in an appropriate solvent, such as acetone, and the resulting solution is added to the particulate active electrode material and additives, if any. The resulting mixture is stirred until an even consistency is obtained. The solvent is removed by, for example, evaporation or pressing the mixture. The resulting dried mixture of polymer and active electrode material may be fabricated into the desired electrode shape by conventional and well-known techniques such as hot pressing, extruding or painting or pasting the viscous slurry of polymer, solvent, active material and additives on a suitable substrate.

Cells may be constructed in any of the well-known and conventional structures in which the positive electrode is spaced from the negative electrode and both are in contact with an ionically conductive electrolyte. The electrolyte should be chemically nonreactive with respect to the material in both the positive and negative electrodes. The electrolyte may, however, interact with the polymer in such a way as to increase its ionic conductivity by forming a polymer-salt complex or swelling the polymer with solvent. Ionic conductivity may also be increased by simultaneous occurrence of both effects. In addition to simple solutions of nonreactive salts in nonreactive solvents, typical electrolytes also include electrochemically reducible oxides, halides, oxyhalides and thiohalides of phosphorus and sulfur. Examples of electrolytes are KOH in $H_2O$, $LiAsF_6$ in propylene carbonate and $LiAlO_4$ in thionyl chloride. If solubility of the polymer in the solvent is a problem, the polymer may be rendered less soluble by crosslinking it with well-known techniques. Suitable current collectors contact both the positive and negative electrodes and permit an electrical current to be drawn by an external circuit.

It is believed that the invention will be better understood by reference to examples illustrating the use of specific poly(phosphazene) polymers with specific electrode materials. It is to be understood, however, that electrode materials are not critical and these examples are for purposes of illustration only and are included as being representative of both the poly(phosphazene) polymers which may be used as binders and the classes of electrode materials with which the binder may be used.

EXAMPLE 1

5 mg PTFEP were dissolved in 10 ml of acetone. For this composition, R is an alkoxy having the composition $OCH_2CF_3$. This solution was added to 1 gm of 50 percent compressed Shawingan black, a commonly used battery carbon, and the mixture was stirred until an even consistency was obtained. The resulting mixture was pressed between sheets of filter paper using a 12 Kgm cylindrical weight and the filter papers were repacked as the acetone was pressed out. The resulting disc-shaped electrode was dried in a vacuum dessicator. The electrode contained 0.5 percent, by weight, of binder. The electrode was mechanically comparable to PTFE-bound electrodes used in nonaqueous electrolyte lithium cells as substrates for the reduction of soluble oxidants, such as thionyl chloride, sulfur dioxide or inorganic polysulfides, and containing significantly greater, for example, 3 to 20, percent, by weight, of binder material. Microscopic comparison of the PTFEP electrode so fabricated showed excellent polymer distribution within the electrode and good contact between carbon particles. The electrode maintained mechanical integrity when aged in either 4 percent aqueous KOH, propylene carbonate or thionyl chloride at 60 degrees C. for times greater than 6 months. The second electrode in the cell used $V_6O_{13}$ as the active electrode material. The active material was diluted with an equal amount of carbon black and bonded with 5 percent, by weight, PTFEP. 1 M $LiAsF_6$ in propylene carbonate was the electrolyte.

EXAMPLE 2

0.05 gm PTFEP and 0.95 gm $TiS_2$ were placed in a vial in an argon-filled dry box. For this composition, R is an alkoxy having the composition $OCH_2CF_3$. 10 ml of freshly distilled tetrahydrofuran(THF) were added to the vial and the mixture was heated and placed on a shaker to dissolve the polymer. 8 ml of THF were removed to render the mixture more viscous and convenient for electrode fabrication. The mixture was fabricated into an electrode by pasting the material on a screen. The negative or second electrode used lithium as the active electrode material and propylene carbonate containing lithium hexafluoroarsenate was the electrolyte. This example was repeated using 0.05 gm of poly(bis) phenoxy phosphazene (PPP), i.e., R is a phenoxy having the composition $OC_6H_5$, as the binder and similar results were obtained.

Alternatively, another substrate material could be used or the dried polymer-$TiS_2$ mixture could be hot-pressed or extruded into the desired electrode shape.

It is to be understood that the electrodes using $TiS_2$ and $V_6O_{13}$ have been given as examples of the class of electrodes using intercalable and reducible compounds, e.g., $MoO_2$ and AgCl, as the active electrode material that may use the poly(phosphazenes) as a binder.

EXAMPLE 3

10 mg of $V_6O_{13}$ and 10 mg of carbon black were mixed. The $V_6O_{13}$ was the active material and the carbon black was a conductive additive. The $V_6O_{13}$ and carbon black were mixed with 1 ml of a tetrahydrofuran solution containing 1 mg dissolved PTFEP polymer. The materials were poured into a 0.75 cm diameter recess in a PTFE sheet and the solvent was allowed to evaporate. A disc-shaped electrode suitable for use in a lithium cell resulted.

This example was repeated utilizing 0.95 g $V_6O_{13}$ and 0.05 g PTFEP polymer dissolved in 2 ml acetone. This slurry was poured into a glass dish and the solvent was evaporated to yield a flexible film of electrode material that could be cut into the desired shape and bonded to a suitable substrate by hot pressing at 100 degrees C.

I claim:

1. A cell comprising a first electrode, a second electrode, and an electrolyte, at least one of said electrodes comprising active electrode material and a binder; CHARACTERIZED IN THAT said binder comprises a polymer having the atom formula $(R_2P=N)_n$, n greater than or equal to 3, R selected from the group consisting of alkoxy, alkyl, amino, aryl, aryloxy, halogen and phenoxy.

2. A cell as recited in claim 1 in which said binder comprises at least 0.5 percent, by weight, of said electrode.

3. A cell as recited in claim 2 in which said active electrode material is an intercalable or reducible compound.

4. A cell as recited in claim 2 or 3 in which R is an alkoxy having the atom formula $OH_2C_{m+2}F_{2m+3}$, m greater than or equal to zero.

5. A cell as recited in claim 4 in which m is zero.

6. A cell as recited in claim 4 in which said electrolyte is $LiAsF_6$ and propylene carbonate.

7. A cell as recited in claim 1 in which said active material is carbon.

8. A cell as recited in claim 7 in which R is selected from the group consisting of $OH_2C_{m+2}F_{2m+3}$, m greater than or equal to zero, and $OC_6H_5$.

9. A cell as recited in claim 8 in which m is zero.

10. A cell as recited in claim 7 in which said electrolyte is a solution of a salt in an active solvent selected from the group consisting of electrochemically reducible oxides, halides, oxyhalides and thiohalides of phosphorus and sulfur.

11. A cell as recited in claim 1 in which said polymer is crosslinked.

12. A cell as recited in claim 7 in which said electrolyte is a solution of a salt in an inactive solvent.

* * * * *